United States Patent
Behere

(10) Patent No.: US 11,251,864 B1
(45) Date of Patent: Feb. 15, 2022

(54) LOGICAL CUT OF AN OPTICAL FIBER DUE TO FIBER EVENTS

(71) Applicant: Amazon Technologies, Inc., Seattle, WA (US)

(72) Inventor: Prabhat Praveen Behere, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/918,154

(22) Filed: Jul. 1, 2020

(51) Int. Cl.
  *H04B 10/079* (2013.01)
  *H04B 10/077* (2013.01)
  *H04Q 11/00* (2006.01)
  *H04B 10/25* (2013.01)

(52) U.S. Cl.
  CPC ..... *H04B 10/0771* (2013.01); *H04B 10/0791* (2013.01); *H04B 10/0795* (2013.01); *H04B 10/25* (2013.01); *H04Q 11/0062* (2013.01); *H04Q 2011/0081* (2013.01)

(58) Field of Classification Search
  None
  See application file for complete search history.

(56) References Cited

U.S. PATENT DOCUMENTS

| | | | | |
|---|---|---|---|---|
| 6,898,376 B1* | 5/2005 | Gerstel | ............... | H04B 10/032 398/2 |
| 6,944,399 B2* | 9/2005 | Yu | ....................... | H04B 10/296 398/17 |
| 6,999,683 B2* | 2/2006 | Kerfoot, III | ......... | H04B 10/296 385/15 |
| 7,532,817 B1* | 5/2009 | Ko | ....................... | H04B 10/032 398/20 |
| 8,971,706 B2* | 3/2015 | Gerstel | ................... | H04B 10/07 398/57 |
| 9,020,353 B2* | 4/2015 | Inoue | ................... | H04B 10/291 398/83 |
| 10,152,036 B2* | 12/2018 | Vedam | ................... | G05B 13/041 |
| 2001/0021045 A1* | 9/2001 | Tervonen | ......... | H04B 10/07955 398/5 |
| 2002/0021659 A1* | 2/2002 | Meijen | ............... | H04Q 11/0062 370/217 |
| 2002/0181036 A1* | 12/2002 | Achour | .............. | H04B 10/1123 398/27 |
| 2002/0197004 A1* | 12/2002 | Feinberg | ............ | H04Q 11/0005 385/24 |
| 2004/0114925 A1* | 6/2004 | Berthold | ............. | H04J 14/0294 398/45 |

(Continued)

*Primary Examiner* — Li Liu
(74) *Attorney, Agent, or Firm* — Klarquist Sparkman, LLP

(57) ABSTRACT

An optical switch configuration is disclosed that gives the appearance of a logical cut in a fiber optic line. The inputs to the optical switch are redundant so that if a fiber event occurs on one input, the optical switch can switch to the other input. In the case where both paths of an optical fiber have fiber events, router convergence is delayed. One mechanism to mitigate a prolonged fiber degradation is to dampen the optical power on the output optical fiber of the optical switch, such that it creates a loss of light and appears as a clean cut of the optical fiber. Another solution uses optical switches to inject an alternate light source onto the output optical fiber, wherein the alternate light source is of a wavelength to be filtered out giving an appearance of a clean cut of the optical fiber.

12 Claims, 8 Drawing Sheets

(56) References Cited

U.S. PATENT DOCUMENTS

| | | | | |
|---|---|---|---|---|
| 2004/0218551 | A1* | 11/2004 | Goldberg | H04L 45/48 370/256 |
| 2005/0019031 | A1* | 1/2005 | Ye | H04B 10/27 398/19 |
| 2005/0089331 | A1* | 4/2005 | Margalit | H04B 10/40 398/139 |
| 2005/0174563 | A1* | 8/2005 | Evans | H04B 10/85 356/73.1 |
| 2005/0180316 | A1* | 8/2005 | Chan | H04J 14/0291 370/216 |
| 2005/0180749 | A1* | 8/2005 | Koley | H04J 14/0294 398/45 |
| 2005/0213970 | A1* | 9/2005 | Kimura | H04J 14/0294 398/45 |
| 2006/0115266 | A1* | 6/2006 | Levi | H04L 1/22 398/19 |
| 2006/0133804 | A1* | 6/2006 | Boduch | H04J 14/0295 398/5 |
| 2006/0188253 | A1* | 8/2006 | Shimada | H04B 10/07955 398/31 |
| 2006/0263089 | A1* | 11/2006 | Furst | H04J 14/0297 398/79 |
| 2007/0086332 | A1* | 4/2007 | Way | H04J 14/0221 370/223 |
| 2007/0297795 | A1* | 12/2007 | Kinoshita | H04B 10/032 398/41 |
| 2009/0116842 | A1* | 5/2009 | Stango | H04J 14/0217 398/83 |

* cited by examiner

LOGICAL CUT OF AN OPTICAL FIBER DUE TO FIBER EVENTS

BACKGROUND

An optical switch is a device that selectively switches optical signals from one channel to another. An optical fiber used as a communication channel can have redundancy built into it by using two redundant paths. The optical switch mitigates against fiber events (e.g., fiber cuts, fiber degrades, flaps, etc.) by detecting the fiber event on one path and switching to the redundant path. However, in some cases, fiber events can occur on both paths.

DETAILED DESCRIPTION

An optical switch has at least two inputs and switches one of the inputs to an output. The inputs are redundant so that if a fiber event happens on one input, the optical switch can switch to the other input and maintain transmission of an optical signal. In the case where both paths of an optical fiber go down or have fiber events, router convergence is delayed creating a prolonged user impact. One mechanism to mitigate a prolonged fiber degradation is to dampen the optical power on the output optical fiber of the optical switch such that it creates a loss of light and appears as a clean cut of the optical fiber. The appearance of a clean cut on router interfaces results in an immediate span shift performed by the router and faster router convergence. Another solution uses optical switches to inject an alternate light source onto the output optical fiber, wherein the alternate light source is of a wavelength to be filtered out giving an appearance of a clean cut of the optical fiber. Stability timers can also be used to determine when a path can be returned into service.

Figure 1:
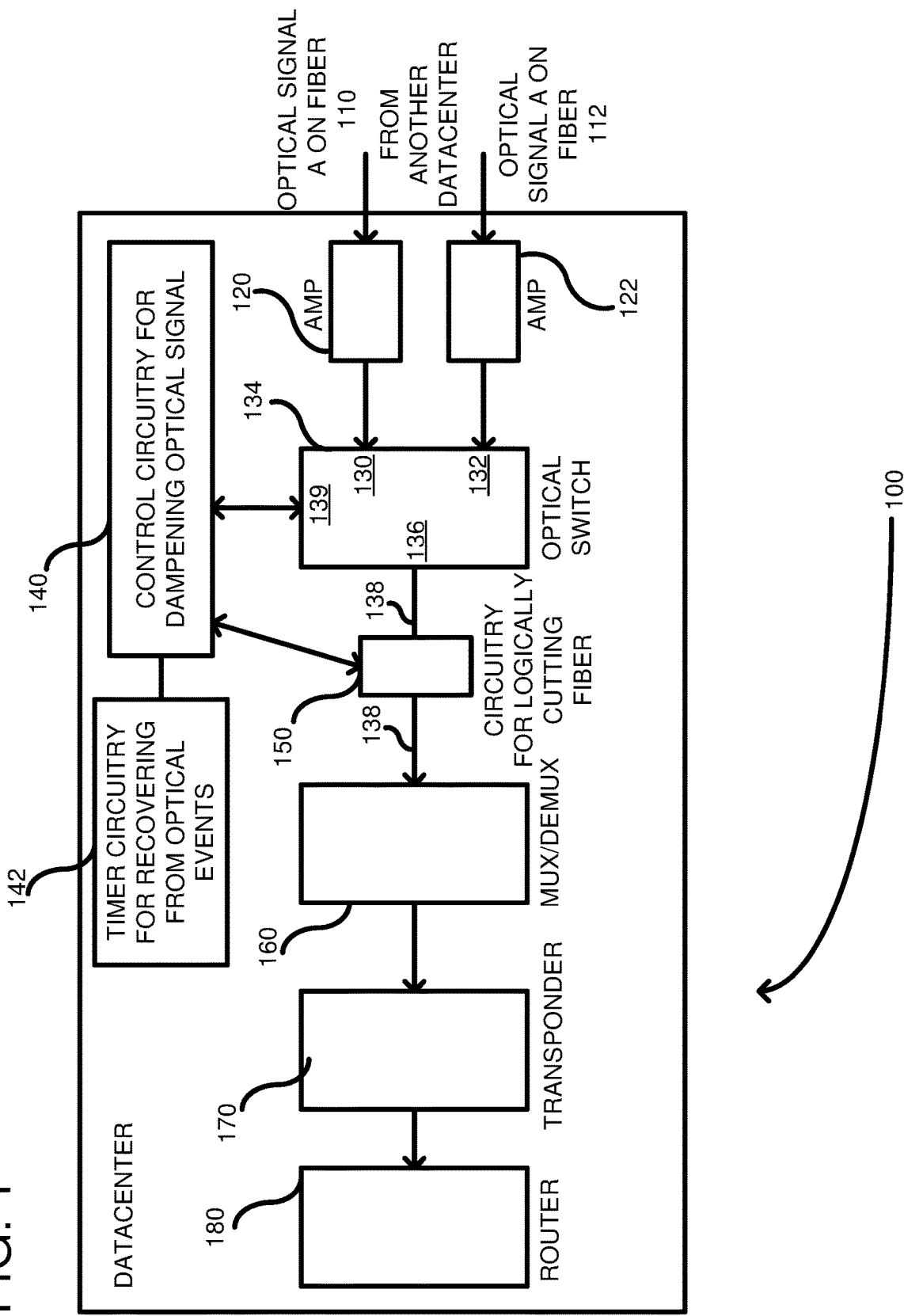
FIG. 1 is an example system for logically cutting an optical fiber due to fiber events.

FIG. 1 is a system diagram of a data center 100 that is receiving redundant optical signals. Optical fibers 110, 112 are received from an external portion of the network, such as from another data center (not shown) and are used for redundancy of an optical signal. The optical fibers 110, 112 are included in a cable that includes multiple optical fibers (not shown for simplicity). The optical fibers 110, 112 are coupled to corresponding amplifiers 120, 122. The amplifiers 120, 122 amplify the optical signal A and supply the signal to corresponding inputs 130, 132 of an optical switch 134. The optical switch 134 switches one of the inputs 130, 132 to an output 136 coupled to an output optical fiber 138 (also called a fiber optic transmission line). The optical switch 134 has a number of states as controlled by a select line 139 coupled to control circuitry 140. The select input 139 can be multiple bits. A first state is an idle state in which the optical switch 134 itself chooses which input 130, 132 is switched to the output 136. The optical switch 134 includes internal logic (not shown) that can detect fiber events on the inputs 130, 132 and switch to the other input. A fiber event can be any of a number of interruptions in the optical signal A, such as fiber cuts, fiber degrades and flaps. In a second state (called the forced state), the control circuitry 140 can control the select input 139 to force the optical switch to use either input 130 or 132. Thus, the control circuitry 140 can override the internal logic of the optical switch 134. Timing circuitry 142 can include one or more timers used by the control circuitry, as further described below, to ensure that switching between the inputs 130, 132 is performed after a delay, which provides time for the input signal to become stable.

Figure 2:
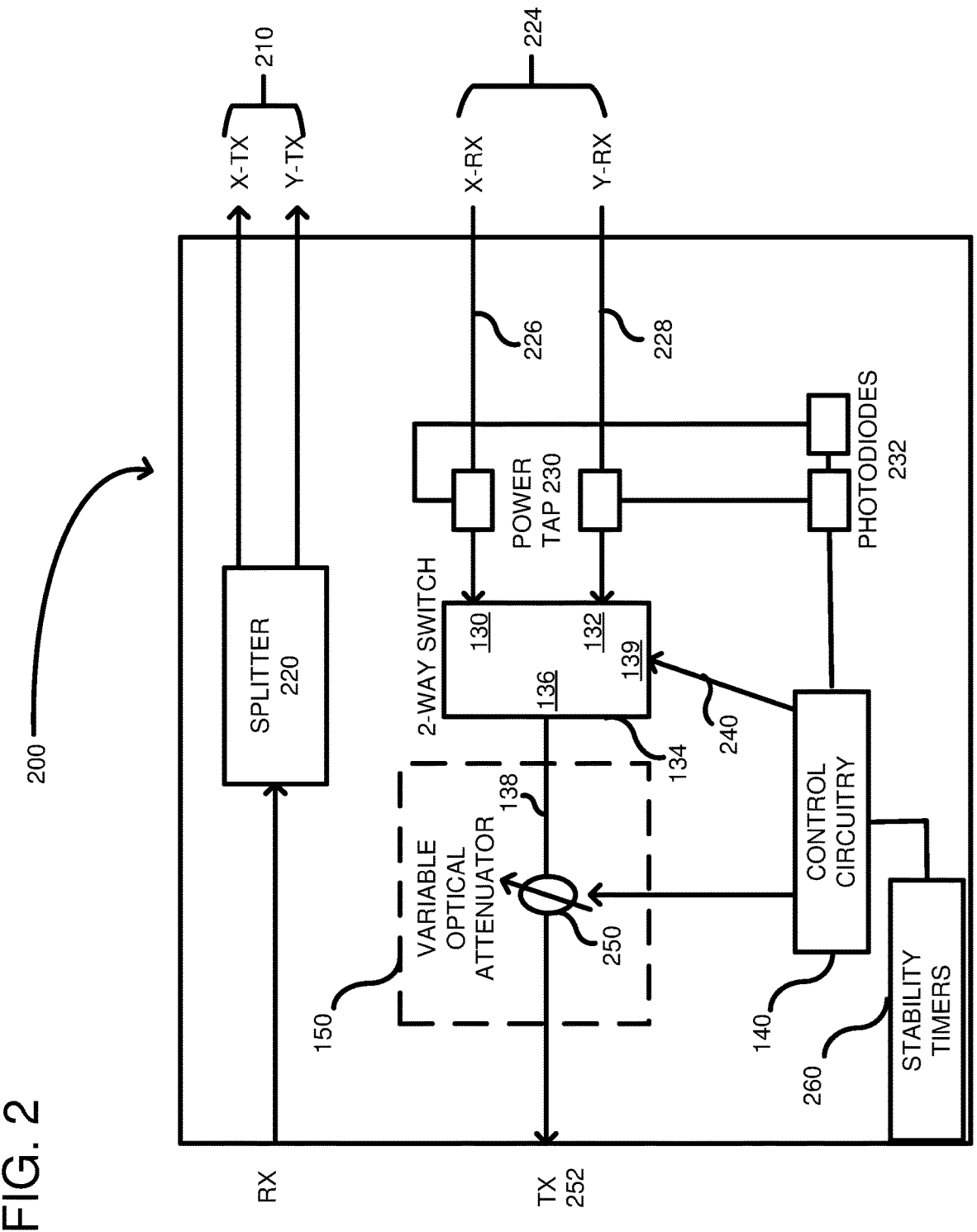
FIG. 2 is an embodiment of the system of FIG. 1, wherein a variable optical attenuator (VOA) is used to perform the logical cut of the optical fiber.
Figure 3:
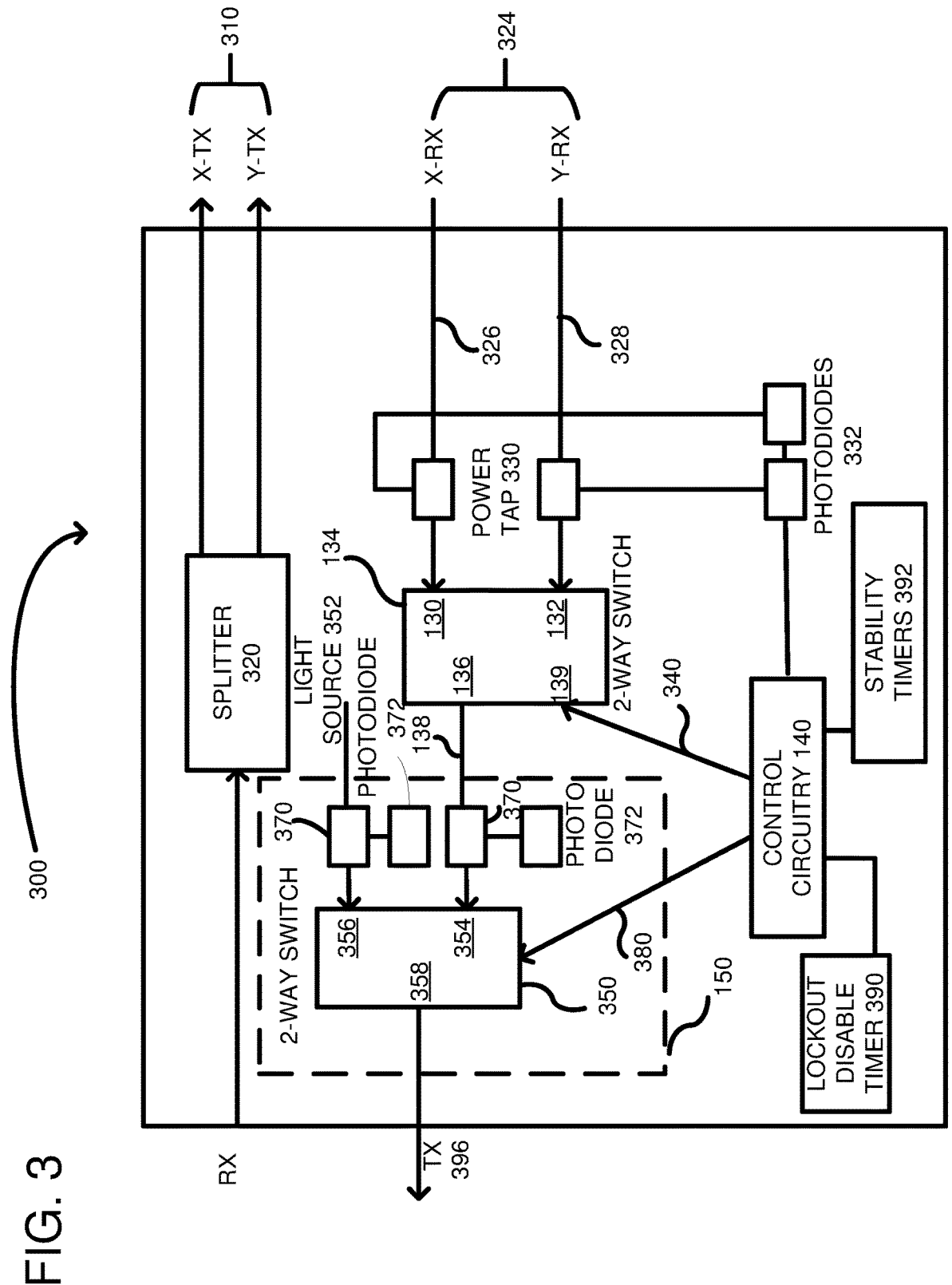
FIG. 3 is an embodiment of the system of FIG. 1, wherein a light source, in conjunction with an optical switch, is injected into the optical fiber to perform the logical cut.

Downstream of the optical switch 134 and coupled to the output optical fiber 138 is circuitry 150 for logically cutting the optical fiber 138. Different embodiments of the circuitry are shown in FIGS. 2 and 3 include dampening the optical signal A or injecting light from a light source onto the optical fiber 138 so as to give the appearance of a cut optical fiber, while the apparent break is electronically controllable. A multiplexer/demultiplexer 160 has a filter function that filters certain light frequencies and provides only light signals within a desired range to a transponder 170. The transponder 170 converts the light signals into electrical signals and transmits the electrical signals to a router 180. When the transponder 170 is either not receiving light or determines that framing within an optical signal is not valid, then the transponder considers that there is an outage and does not forward the optical signal to the router 180. The router 180 is coupled to other routers (not shown) in the data center 100 so as to deliver information encoded in the signal A to a server computer within the data center. Although not shown, it is understood that the circuitry for logically cutting the fiber 150 can be at any downstream position prior to the router, such as between the multiplexer/demultiplexer 160 and the transponder 170.

FIG. 2 is a first embodiment of a circuit 200 including the optical switch 134 and the circuitry 150 for logically cutting the optical fiber 138. In this embodiment, redundant transmit and receive lines are shown. In particular, the transmitted signal 210 includes signals X and Y, which are made redundant by a splitter 220. Receive signals 224, which are also redundant, are input into the optical 2-way switch 134 on inputs 130, 132. One of the inputs 130, 132 is coupled to output 136 depending on the current state of the optical switch 134. Each optical fiber 226, 228 is coupled to the switch 134 at inputs 130, 132, respectively. Power taps 230 on each optical fiber 226, 228 measure a power level of the signals on the optical fiber. Photodiodes 232 are coupled to the power taps 230 and read the power levels on the power taps. The resultant power levels are transmitted from the photodiodes 232 to the control circuitry 140. Using the power tap 230, the control circuitry 140 can detect a fiber event on the optical fibers 226, 228 and control the select line 240 correspondingly, as described further below. Additionally, the control circuitry 140 can control a variable optical attenuator (VOA) 250, which dampens the optical signal on the output optical fiber 138. A stability timer 260 is used by the control circuitry 140. The control circuitry 140 can be a processing unit, such as a general-purpose central processing unit (CPU), processor in an application-specific integrated circuit (ASIC) or any other type of processor. The dampening VOA 250 is used to create a power outage at a TX (transmit) output 252. By setting a high attenuation value on the VOA 250, the optical power across the TX output can be brought below the RX sensitivity of the downstream transponder, triggering a span cut and a consecutive span shift. The dampening VOA can take two values: high (e.g., >20 dB) and low (e.g., 0 dB).

Stability timers 260 are coupled to the control circuitry 140. Each timer is triggered as soon as a fiber recovers from an unhealthy state. Generally, there is one timer per input path. The fiber optic path is monitored for the period of this timer to prevent returning an unstable path back in service. In case there is a second flap within the timer window then this timer is reset to a maximum value and the countdown is restarted after recovery of the event. The minimum duration of this timer can cover the time taken to complete the shift of traffic on the span and the maximum can be decided based on the fiber flap data in the region. For example, if the fiber is prone to multiple flaps over extended period of time, then the value of the timer can be set accordingly (e.g., 5 or 10 minutes).

The table below is an example of how the control circuitry 140 and the stability timer 260 can control the switch 134 and the VOA 250.

A value of the VOA 250 is SET to HIGH if ((P_rx_X<P_thres_X OR Stab_timer_X>0) AND (P_rx_Y<P_thres_Y OR Stab_timer_Y>0)) else LOW Where the following are used:

P_rx_X and P_rx_Y are the Rx power at an optical switch for X and Y path respectively.

P_thres_X and P_thres_Y are the minimum power threshold settings at port 130, 132, respectively.

Stab_timer_X and Stab_timer_Y are the stability timers associated with X and Y paths respectively.

Considering X and Y are paths having equal priority, there can be six unique scenarios as summarized table below:

| Scenario | P_rx_X < P_thres_X | Stab_timer_X > 0 | P_rx_Y < P_thres_Y | Stab_timer_Y > 0 | VOA value | Notes |
|---|---|---|---|---|---|---|
| 1 | F | F | F | F | LOW | Steady state with both paths up. |
| 2 | T | F | F | F | LOW | One path down. Switch to other path. |
| 3 | F | T | F | F | LOW | One path within stability timer window. Other path stable and active. |
| 4 | T | F | T | F | HIGH | Both paths down. It can be due to a flap or cut. |
| 5 | T | F | F | T | HIGH | One path cut and other in stability timer window. |
| 6 | F | T | F | T | HIGH | Both paths in stability timer window. |

To summarize, an optical fiber is considered down if it is in a stability timer window or it is currently down. And if both optical fibers are down, then the VOA value is high, meaning that the optical fiber 138 is logically cut, as it is not visible by the transponder 170. As a result, the router 180 believes that the optical fiber leading up to the transponder 170 is cut somewhere along its path.

FIG. 3 is a second embodiment a circuit 300 including the optical switch 134 and the circuitry 150 for logically cutting the optical fiber 138. In this embodiment, redundant transmit and receive lines are shown. In particular, a transmitted signal 310 includes signals X and Y, which are made redundant by a splitter 320. Receive signals 324 are input into the optical 2-way switch 134 on inputs 130, 132. One of the inputs 130, 132 is coupled to output 136. Each optical fiber 326, 328 is input into the switch 134 at inputs 130, 132, respectively. Power taps 330 on each optical fiber 326, 328 measure a power level of the signals on the optical fiber. Photodiodes 332 are coupled to the power taps 330 and read the power levels on the power taps. The resultant power levels are transmitted from the photodiodes 332 to the control circuitry 140. Using the power tap 330, the control circuitry 140 can detect a fiber event on the optical fibers 326, 328 and control the select line 340 correspondingly.

The circuitry 150 for logically cutting the optical fiber 138 includes a second two-way switch 350 and a light source 352. The second two-way optical switch 350 is coupled in series with the first two way switch 134 such that the output 136 of the first switch 134 is coupled to an input 354 of the switch 350. The light source 352 is coupled to the other input 356. The control circuitry 140 controls which input 354, 356 is switched to an output 358. Power taps 370 and photodiodes 372 can monitor power levels on the inputs 354, 356. The control circuitry 140 can control a select line 380 to the switch 350 in order to control whether an input 354 is switched to output 358 or the light source 352 is switched to output 358.

The second level of optical switch 350 is introduced to deal with scenarios when both X and Y fibers 326, 328 register a near simultaneous event. In case when both X and Y paths go down, then the secondary switch 350 is triggered to move to the light source 352. The light source is chosen to be such that it creates a complete outage/fault at the transponder 170, which translates into a clean fiber cut. In order to orchestrate a clean fiber cut, the power at the transponder 170 should drop below its sensitivity. In one example, this can be achieved using any 1310 nm pluggable optic capable of emitting optical power between below 0 dB or lower depending on the sensitivity of the photodiodes. The 1310 nm light is filtered out by the demultiplexer 160 creating a power outage at the transponder 170, which can operate in 1550 nm window. Other wavelengths can be used depending on the particular design.

In the steady state with both X and Y paths 326, 328 are in service (i.e., healthy optical power), and input port 354 is active. The select line 380 can select port 354 in a forced mode such that the switch 350 is disabled. If one of the fiber optic paths goes down (say path 326) or has a fiber event, the switch 134 switches to the other healthy path. When switch 134 switches, switch 350 sees an intermittent fiber event on input 354. Because switch 350 is in forced state, switch 350 does not switch to input 356. After expiry of a lockout disable timer 390, input port 356 is moved to an idle state.

In the event, the fiber 326 recovers, the stability timer 392 is triggered. At the end of timer 392, input port 356 is moved to the lockout state and the system returns to a steady state.

In an event that both input paths 326, 328 have fiber events, it will create an intermittent lockout state at input port 354 causing a switch to port 356. The switch to input port 356 creates a blackout at the transponder 170 triggering a span-traffic shift by router 180. At the end of the timer 392, the first path is declared stable triggering a switch to input port 354 and thus returning path 326 in service.

The following table summarizes the states of FIG. 3, wherein Z corresponds to optic fiber 138 and Z' corresponds to light source 352:

| Scenario | $P\_rx\_X < P\_thres\_X$ | $Stab\_timer\_X > 0$ | $P\_rx\_Y < P\_thres\_Y$ | $Stab\_timer\_Y > 0$ | Lockout mode | Active path | Notes |
|---|---|---|---|---|---|---|---|
| 1 | F | F | F | F | Enabled | Z | Steady state with both paths up. |
| 2 | T | F | F | F | Disabled | Z | One path down. Switch to other path. |
| 3 | F | T | F | F | Disabled | Z | One path within stability timer window. Other path stable and active. |
| 4 | T | F | T | F | Disabled | Z' | Both paths down. It can be due to a flap or cut. |
| 5 | T | F | F | T | Disabled | Z' | One path cut and other in stability timer window. |
| 6 | F | T | F | T | Disabled | Z' | Both paths in stability timer window. |

To summarize, an optical fiber is considered down if it is in a stability timer window or it is currently down. And if both optical fibers 326, 328 are down, then the light source 352 is injected through the switch 350 onto an output fiber 396 coupled to output 358. Due to the wavelength of the light source 352, the optical fiber 396 is logically cut, as it is not visible to the transponder 170. As a result, the router 180 believes that the optical fiber leading up to the transponder 170 is cut somewhere along its path. The router 180 converges in response to select a different path through the network.

Figure 4:
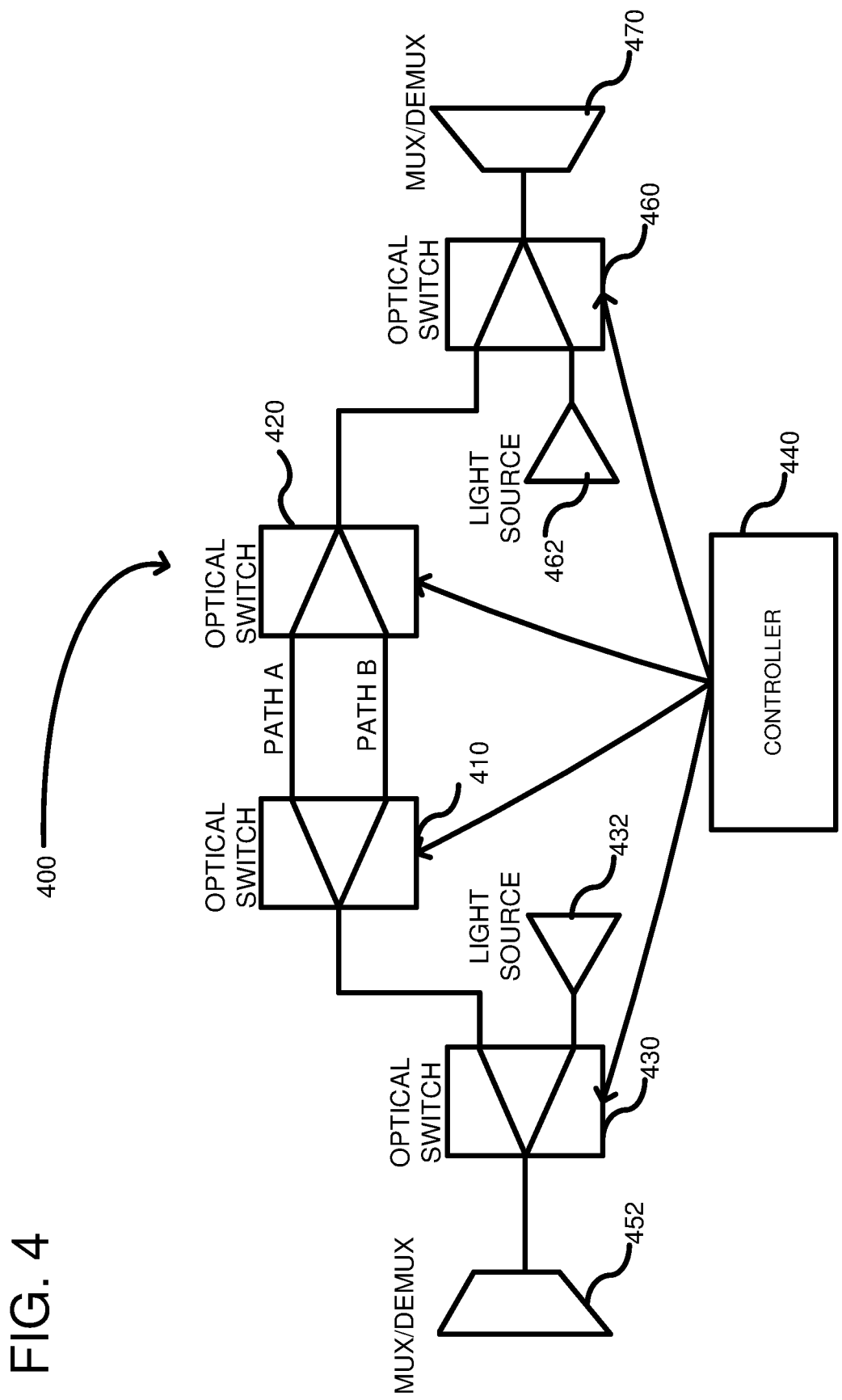
FIG. 4 is another embodiment of the system of FIG. 1, wherein a light source is injected into the optical fiber to perform the logical cut of the optical fiber.

FIG. 4 is yet another embodiment of a system 400 for logically cutting an optical fiber. In this embodiment, optical switches 410, 420 are typically located in different data centers, but can also be in a same data center. Path A and path B between the optical switches 410, 420 are redundant pairs and carry the same optical signal so that if one path is corrupted or has a fiber event, the other path can be used. The optical switches 410, 420 can be plug-in cards located within a shelf of other networking equipment, or within a server computer, not shown, but described in FIG. 8. An optical switch 430 is coupled in series with optical switch 410 such that an output of optical switch 410 is coupled to one of the inputs of optical switch 430. A second input of optical switch 430 is coupled to a light source 432. A controller 440 is coupled to the optical switches 410, 430 and controls which path A, B or the light source 432 is switched onto an output path coupled to a multiplexer/demultiplexer 452. Likewise, an optical switch 460 is coupled in series with the optical switch 420 to allow path A, B or a light source 462 to pass to a multiplexer/demultiplexer 470. The controller 440 can be a central controller executing on one or more server computers or can be divided into separate controllers operating in each data center where the optical switches are located. The operation of the system of FIG. 4 is similar to the operation of FIG. 3 and is not re-described for simplicity. However, the optical switches can be plug-in cards and the light sources 432, 462 can be separate plug-in cards making the setup quick and convenient.

Figure 5:
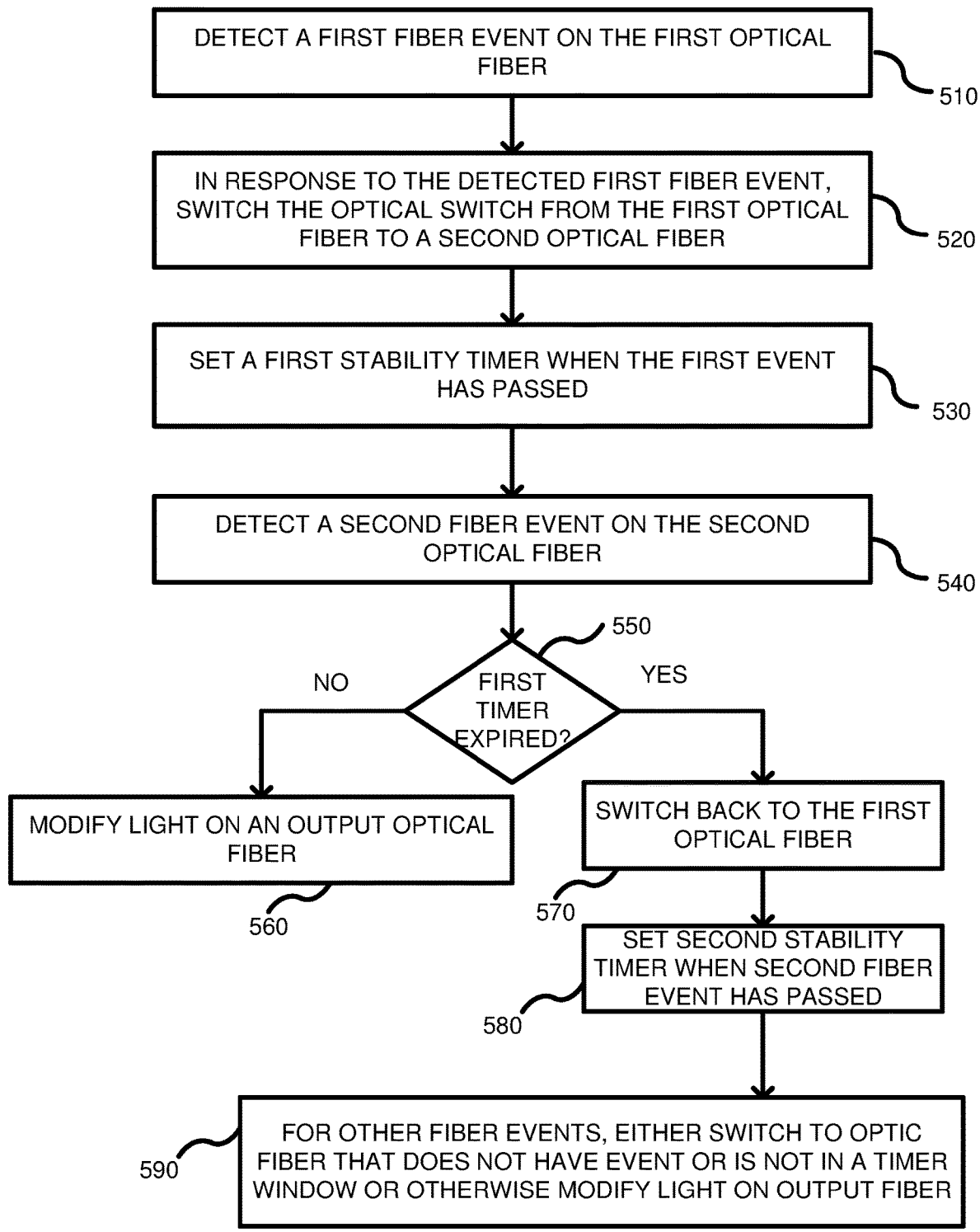
FIG. 5 is a flowchart according to one embodiment for making a logical cut in an optical fiber.

FIG. 5 is flowchart according to one embodiment for logically cutting an optical fiber. In process block 510, a fiber event is detected on a first optical fiber. The fiber event can be any disruption in the optical signal due to flapping, cutting, etc. The fiber event can be due to hardware errors, software errors, configuration errors, intermittent errors or other unreliable conditions. For example, in FIG. 1, a signal on fiber 110 can become unreliable for any of the reasons described above. In process block 520, in response to the detected first fiber event, the optical switch is switched from the first optical fiber to a second optical fiber. For example, in FIG. 1, the optical switch 134 can detect the fiber event on input 130 and switch from input 130 to input 132 so that the signal on input 132 is passed to the output 136. In process block 530, a first stability timer is set when the first event has passed. For example, in FIG. 1, the timer 142 can be set to a value to count down a desired amount of time that the input line should be stable before being usable again. Each input line has a stability timer associated therewith to ensure that the input is stable for a period of time before being placed back into service. In process block 540, a second fiber event is detected on the second optical fiber. For example, in FIG. 1, a fiber event can occur on fiber 112. In decision block 550, a check is made to determine whether the first timer expired. If the timing is such that the fiber 110 has been stable for enough time, the switch 134 can switch back to fiber 110 due to the fiber event on fiber 112. On the other hand, if the fiber 110 is still within a period of instability, the logical cut of the fiber occurs. Thus, if decision block 550 is answered in the negative, then in process block 560, light is modified on the output optical fiber. Specifically, in FIG. 1, light on fiber 138 is modified using circuitry 150. In FIG. 2, the modification of the light is by damping the optical signal so that it is not detectable using VOA 250. In FIG. 3, the light is modified by injecting an alternative light source 352 onto the optical fiber 396 so that the optical signal is not detectable.

If process block 550 is answered in the affirmative, then in process block 570, the optical switch switches back to the first optical fiber and sets a stability timer for the second optical fiber (process block 580). For example, in FIG. 1, the optical switch 134 can switch back to input 130 to use optical fiber 110. In process block 590, for all other fiber events, either switch to the optical fiber that does not have an event or is not within a timer window. Otherwise, if both optical fibers have a fiber event or are within a stability timer window (the timer is still active), then the light on the output optical fiber is modified, as occurred in process block 560.

Figure 6:
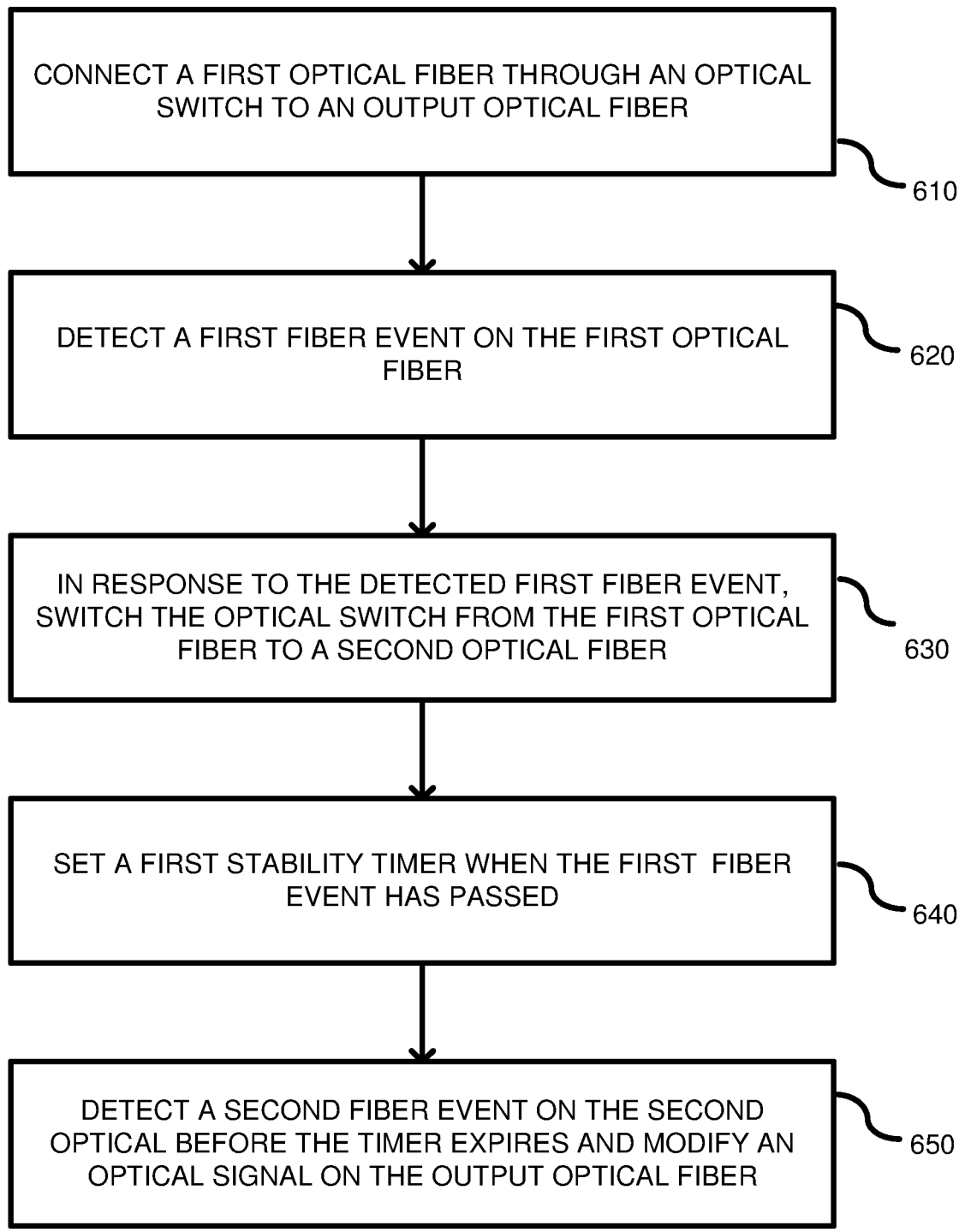
FIG. 6 is a flowchart according to another embodiment for making a logical cut in an optical fiber.

FIG. 6 is a flowchart according to another embodiment for logically cutting an optical fiber due to fiber events. In process block 610, a first optical fiber is connected through an optical switch to an output optical fiber. For example, in FIG. 2, an input optical fiber 226 is passed through the optical switch 134 to an output optical fiber 138. In process block 620, a first fiber event is detected on the first optical fiber. For example, in FIG. 2, a first fiber event is detected on fiber 226. In process block 630, in response to the detected fiber event, the switch is switched from the first optical fiber to the second optical fiber. For example, in FIG. 2, the optical switch can switch from input 130 to input 132. In process block 640, a first stability timer is set when the first fiber event has passed. For example, in FIG. 2, the stability timer 260 can be set once the control circuitry 140 detects that the fiber event has passed through monitoring of the power level on the power tap 230. If the power level is above a threshold, then the fiber event can be considered to have passed. On the contrary, if the power level is below the threshold, then the fiber event is still occurring. In process block 650, a second fiber event is detected on a second optical fiber before the timer expires (within the timer window). As a result, the optical signal on the output optical fiber is modified. For example, in FIG. 2, the VOA 250 dampens the signal or in FIG. 3, the light source 352 is injected on the output line 396.

Figure 7:
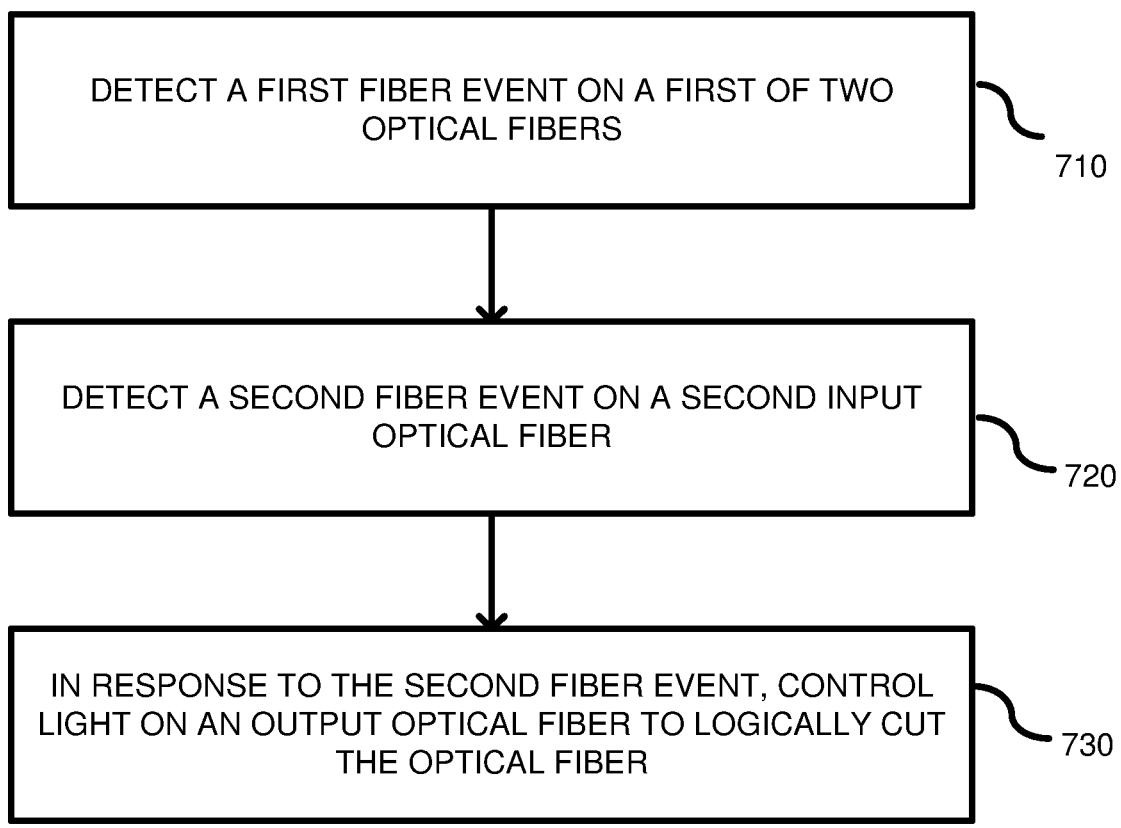
FIG. 7 is a flowchart according to another embodiment for making a logical cut in an optical fiber.

FIG. 7 is a flowchart according to another embodiment. In process block 710, a first fiber event is detected. For example, in FIG. 3, a first optical event is detected on optical fiber 326. In process block 720, a second fiber event is detected on a second input optical fiber. For example, in FIG. 3, a fiber event is detected on fiber 328. Thus, both fibers 326, 328 experience fiber events. In process block 730, in response to the second fiber event, light is controlled on the output optical fiber to logically cut the optical fiber. For example, in FIG. 2, control circuitry 140 controls the VOA to dampen the light signal. Alternatively, in FIG. 3, the control circuitry 140 switches to the light source 352. Other techniques can be used for controlling the light on the output fiber to logically cut the optical fiber.

Figure 8:
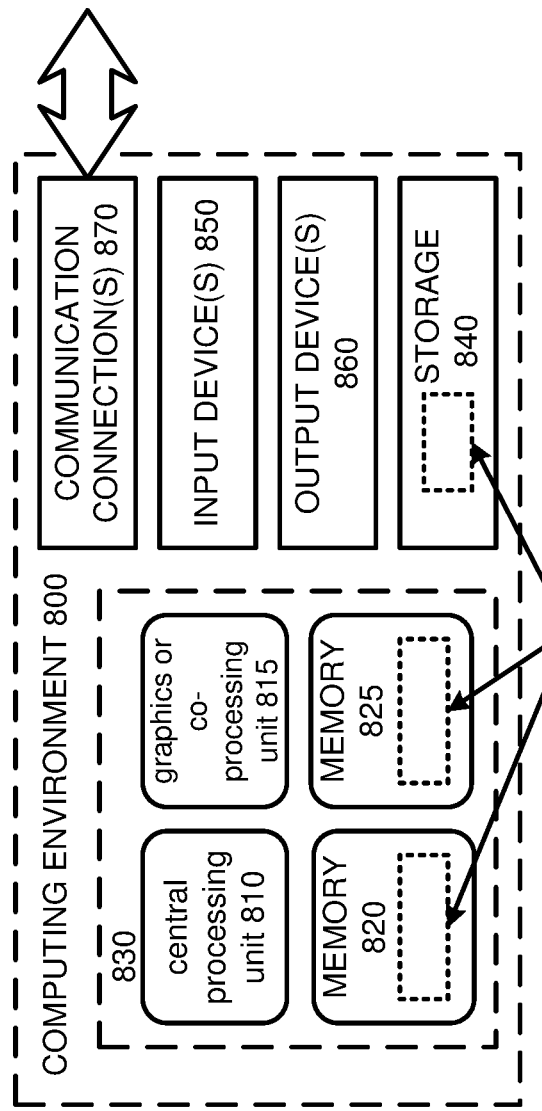
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.).

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s). In one embodiment, the computing environment 800 is a server computer and the optical switches described herein can be inserted into slots of the server computer.

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A method of modifying light on an optical fiber so that the optical fiber appears cut, the method comprising:
    connecting a first optical fiber through an optical switch to an output optical fiber;
    detecting a first fiber event on the first optical fiber;
    in response to detecting the first fiber event, switching the optical switch from the first optical fiber to connect a second optical fiber to the output optical fiber;
    in response to detecting the first fiber event, setting a first stability timer when the first fiber event has passed to ensure that the first optical fiber is stable for a predetermined period of time; and
    in response to detecting a second fiber event on the second optical fiber before the first stability timer expires, modifying an optical signal on the output optical fiber so that the output optical fiber appears cut to a downstream transponder, wherein the modifying of the optical signal includes injecting light from a light source into the output optical fiber that is at a wavelength designed to create a logical cut at an input signal to a transponder;
    wherein the first fiber event and the second fiber event are disruptions in optical signals due to: fiber cuts, fiber degrades, flaps, hardware errors, software errors, configuration errors, intermittent errors, or unreliable conditions.

2. The method of claim 1, wherein a second optical switch is in series with the first optical switch, wherein an output of the first optical switch is coupled to a first input of the second optical switch and the light source is coupled to a second input of the second optical switch.

3. A method of logically cutting an optical fiber, the method comprising:
    detecting a first fiber event on a first input optical fiber coupled to an optical switch;
    detecting a second fiber event on a second input optical fiber coupled to the optical switch;
    wherein the first fiber event and the second fiber event are disruptions in optical signals due to: fiber cuts, fiber degrades, flaps, hardware errors, software errors, configuration errors, intermittent errors, or unreliable conditions; and
    in response to detecting the second fiber event, controlling light on an output optical fiber coupled to an output of the optical switch to logically cut the optical fiber, wherein the controlling of the light includes injecting light from a light source onto the output optical fiber, wherein the light source has a wavelength outside of a range of a transponder coupled to the output optical fiber.

4. The method of claim 3, wherein the optical switch is a first optical switch, which is coupled in series with a second optical switch, and an input to the second optical switch is the light source.

5. The method of claim 4, further including automatically triggering a timer when the first fiber event occurs and switching the second optical switch to an idle state when the timer expires.

6. The method of claim 3, further including, in response to detecting the first fiber event, setting a stability timer when the first fiber event has passed to ensure that the first optical fiber is stable for a predetermined period of time and wherein the controlling of the light occurs when the stability timer has not expired.

7. A system, comprising:
    an optical switch having redundant first and second fiber optic inputs and an output coupled to a fiber optic transmission line;

first and second power taps on the first and second fiber optic inputs, respectively, to monitor power on the first and second fiber optic inputs;
a controller coupled to the first and second power taps to monitor for fiber events on the first and second fiber optic inputs; and
circuitry coupled to the controller and to the fiber optic transmission line to logically cut the fiber optic transmission line;
wherein the optical switch is a first optical switch and the circuitry includes a light source coupled to a second optical switch, wherein the controller is configured to switch the light source onto the fiber optic transmission line in response to fiber events on the first and second fiber optic inputs;
wherein the fiber events are disruptions in optical signals due to: fiber cuts, fiber degrades, flaps, hardware errors, software errors, configuration errors, intermittent errors, or unreliable conditions.

8. The system of claim 7, wherein the light source is of a wavelength to give an appearance to a transponder that the fiber optic transmission line has been cut.

9. The system of claim 7, wherein the optical switch is configured to switch from the first fiber optic input to the second fiber optic input in response to detecting a fiber event on the first fiber optic input.

10. The system of claim 7, further including first and second timers coupled to the controller, the first and second timers configured to track an amount of time since a fiber event has passed.

11. The system of claim 7, wherein the optical switch has a forced state and an idle state, wherein, in the forced state, the controller forces the optical switch to pass one of the first or second fiber optic inputs to the output, and, wherein, in the idle state, the optical switch chooses which of the first and second fiber optic inputs to pass to the output based upon fiber events detected.

12. The system of claim 7, further including a timer coupled to the controller, wherein the timer is triggered when either of the first and second fiber optic inputs experiences a fiber event and, wherein the controller forces the optical switch into a locked state while the timer is counting down.

* * * * *